US005379180A

United States Patent [19]

[11] Patent Number: 5,379,180

[45] Date of Patent: Jan. 3, 1995

Kinoshita

[54] CAPACITOR COMPRISING POLYETHYLENE 2,6-NAPHTHALATE FILM

[75] Inventor: Shin-ichi Kinoshita, Tokyo, Japan

[73] Assignee: Diafoil Hoechst Company, Limited, Tokyo, Japan

[21] Appl. No.: 104,586

[22] Filed: Aug. 11, 1993

[30] Foreign Application Priority Data

Aug. 17, 1992 [JP] Japan ........ 4-217970

[51] Int. Cl.$^{6}$ ........ H01G 4/08; H01G 1/01; H01G 1/015

[52] U.S. Cl. ........ 361/323; 361/304; 361/305

[58] Field of Search ........ 361/301.5, 304, 305, 361/323; 428/423.1, 423.7, 423.8, 459, 458, 480, 910; 29/25.42

[56] References Cited

U.S. PATENT DOCUMENTS

| | | | |
|---|---|---|---|
| 4,241,129 | 12/1980 | Marton et al. | 428/216 |
| 4,503,189 | 3/1985 | Igarishi et al. | 525/104 |
| 4,814,221 | 3/1989 | Utsumi | 428/220 |
| 4,886,700 | 12/1989 | Younes | 428/252 |
| 4,990,400 | 2/1991 | Endo et al. | 428/331 |
| 5,096,980 | 3/1992 | Yamazaki | 525/438 |

FOREIGN PATENT DOCUMENTS

| | | |
|---|---|---|
| 0225631 | 6/1987 | European Pat. Off. . |
| 0484956 | 5/1992 | European Pat. Off. . |

*Primary Examiner*—Bruce A. Reynolds
*Assistant Examiner*—Michael D. Switzer
*Attorney, Agent, or Firm*—Foley & Lardner

[57] ABSTRACT

A capacitor comprising a polyethylene 2,6-naphthalate film as a base film, a coating layer, formed on at least one surface of said base film, which coating layer comprises a water-soluble or water-dispersible resin and has a center line average surface roughness (Ra) of 0.005 to 0.5 $\mu$m, and a metal layer deposited on said coated polyethylene 2,6-naphthalate film, wherein said coated polyethylene 2,6-naphthalate film has an F5 value in a machine direction of at least $1.5\times10^{8}$ Pa, a Young's modulus in a machine direction of at least $5.9\times10^{9}$ Pa, and a Young's modulus in a transverse direction of at least $5.9\times10^{9}$ Pa, which capacitor has good moist-heat resistance and long-term stability.

8 Claims, No Drawings

CAPACITOR COMPRISING POLYETHYLENE 2,6-NAPHTHALATE FILM

BACKGROUND OF THE INVENTION

1. Field of the Invention

The present invention relates to a capacitor comprising a metal-deposited polyethylene 2,6-naphthalate film. More particularly, the present invention relates to a moist-heat resistant capacitor comprising a metal deposited polyethylene 2,6-naphthalate film which has improved adhesion between the film and the deposited metal.

2. Description of the Related Art

A polyester film a typical example of which is a polyethylene terephthalate film is used as a base film of a capacitor, since it is excellent in mechanical properties, heat resistance and electrical properties. With the recent progresses in various electric and electronic equipments, requirements for small-sizing and long-term reliability of the capacitor are becoming more stringent. Since an electrostatic capacity of the capacitor is inversely proportional to a thickness of a dielectric material, it is required to reduce the thickness of the base film so as to improve dielectric properties of the capacitor.

However, the conventionally used polyethylene terephthalate film cannot satisfy the requirement for the reduction of film thickness sufficiently. That is, since a very thin polyethylene terephthalate film has a very small strength per unit cross section of the film, it has poor workability or processability in the production step of capacitors including the vacuum deposition of metal.

To solve the above problem, attention is paid on a capacitor comprising, as a substrate film, a polyethylene 2,6-naphthalate film as disclosed in Japanese Patent Kokai Publication No. 136013/1987. In comparison with the polyethylene terephthalate film, the polyethylene 2,6-naphthalate film has poor adhesion to the deposited metal. When the capacitor comprising the polyethylene 2,6-naphthalate film is stored in a high temperature high humidity atmosphere, moisture penetrates in an interface between the base film and the deposited metal layer, so that the electrostatic capacity of the capacitor decreases with time. Accordingly, improvement of moist-heat resistance of the capacitor is highly desired to achieve good long-term stability.

SUMMARY OF THE INVENTION

An object of the present invention is to provide a capacitor comprising a polyethylene 2,6-naphthalate film as a base film, which has good adhesion to a deposited metal layer and longterm stability.

According to the present invention, there is provided a capacitor comprising a polyethylene 2,6-naphthalate film as a base film, a coating layer, formed on at least one surface of said base film, which coating layer comprises a water-soluble or water-dispersible resin and has a center line average surface roughness (Ra) of 0.005 to 0.5 $\mu m$, and a metal layer deposited on said coated polyethylene 2,6-naphthalate film, wherein said coated polyethylene 2,6-naphthalate film has an F5 value in a machine direction of at least $1.5\times10^8$ Pa, a Young's modulus in a machine direction of at least $5.9\times10^9$ Pa, and a Young's modulus in a transverse direction of at least $5.9\times10^9$ Pa.

DETAILED DESCRIPTION OF THE INVENTION

Herein, polyethylene 2,6-naphthalate is intended to mean a polyethylene 2,6-naphthalate polymer at least 80% of which repeating units is ethylene 2,6-naphthalate. Examples of copolymerizable components other than the above repeating units are diol components such as diethylene glycol, propylene glycol, neopentyl glycol, polyethylene glycol, polytetramethylene glycol, etc.; dicarboxylic acid components such as terephthalic acid, isophthalic acid, 2,7-naphthalenedicarboxylic acid, 5-sodiumsulfoisophthalic acid, adipic acid, azelaic acid, sebacic acid, and their ester-forming derivatives; hydroxymonocarboxylic acids such as hydroxybenzoic acid and its ester-forming derivatives; and the like.

Since polyethylene 2,6-naphthalate has decreased mechanical properties when its polymerization degree is too small, its intrinsic viscosity is usually at least 0.40 cps, preferably from 0.5 to 0.7 cps.

Polyethylene 2,6-naphthalate used in the present invention has preferably a carboxyl value of 15 to 100 equivalent/ton, more preferably 40 to 95 equivalent/-ton, in particular 50 to 90 equivalent/ton. Since the presence of carboxyl groups will improve the adhesion between the base film and the coating layer, the carboxyl value is preferably at least 15 equivalent/ton. When the carboxyl value is too large, the heat resistance and mechanical characteristics of polyethylene 2,6-naphthalate are deteriorated. Then, it is preferably not larger than 100 equivalent/ton.

The polyethylene 2,6-naphthalate film to be used in the present invention may contain additive particles, precipitated particles or other catalyst residues, which form protrusions on the film surfaces in an amount that the characteristics of the capacitor are not deteriorated. In addition to such particles, the polyester film may contain other additive such as an antistatic agent, a stabilizer, a lubricant, a cross linking agent, an antiblocking agent, an antioxidant, a colorant, a light-shielding agent, a UV-light absorber, and the like in an amount that the characteristics of the capacitor are not worsened.

Insofar as the final properties of the polyethylene 2,6-naphthalate film satisfy the requirements of the present invention, the film may have a multi-layer structure. In the case of multilayer structure, a part of the layer may be made a polymer other than polyethylene 2,6-naphthalate.

The coating layer of the present invention comprises the water-soluble or water-dispersible resin and is formed by applying a coating liquid containing at least one resin selected from the group consisting of polyester resins, vinyl chloride/vinyl acetate copolymer resins, polyether resins, butadiene base resins, acrylic resins, polyurethane resins, cellulose resins, and the like, on at least one surface of the polyethylene 2,6-naphthalate film, and drying the coated liquid. Among the above resins, the polyurethane resins and the polyester resins are preferred.

As components constituting the polyurethane such as a polyol, a polyisocyanate, a chain extender and a cross linking agent, the following materials can be exemplified.

Examples of the polyol are polyethers (e.g., polyoxyethylene glycol, polyoxypropylene glycol, polyoxytetramethylene glycol, etc.), polyesters (e.g., polyethylene adipate, polyethylenebutylene adipate, polypropylene adipate, polyhexylene adipate, polycaprolactone, etc.), acrylic polyols, castor oil, and the like.

Examples of the polyisocyanate are aromatic diisocyanates (e.g., tolylene diisocyanate, phenylene diisocyanate, 4,4'-diphenylmethane diisocyanate, 1,5-naphthalene diisocyanate, etc.) and aliphatic diisocyanates (e.g., xylylene diisocyanate, hexamethylene diisocyanate, 4,4'-dicyclohexylmethane diisocyanate, isophorone diisocyanate, etc.).

Examples of the chain extender or the cross linking agent are ethylene glycol, propylene glycol, butanediol, hexanediol, diethylene glycol, trimethylolpropane, hydrazine, ethylenediamine, 4,4'-diaminodiphenylmethane, 4,4'-diaminodicyclohexylmethane, water and the like.

As the components constituting the polyester resin, the following polycarboxylic acids or polyhydric hydroxy compounds can be exemplified.

Examples of the polycarboxylic acids are terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, sodium trimellitate, and their ester-forming derivatives.

Examples of the polyhydric alcohols are ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylylene glycol, bisphenol A/ethylene glycol adducts, diethylene glycol, triethylene glycol, polyethylene glycol, polypropylene glycol, polytetramethylene glycol, polytetramethyleneoxide glycol, dimethylolpropionic acid, glycerol, trimethylolpropane, sodium dimethylolethylsulfonate, potassium dimethylolpropionate, and the like.

From the above compounds, at least one polycarboxylic acid and at least one polyhydric hydroxy compound are selected and subjected to a conventional polycondensation reaction to obtain the polyester resin.

In addition to the above polyester, it is possible to use a complex polymer comprising a polyester component such as a so-called acryl-grafted polyester which is disclosed in Japanese Patent Kokai Publication No. 165633/1989, or polyesterpolyurethane which is prepared by chain extending a polyesterpolyol with an isocyanate., and so on.

In the present invention, the resin which forms the coating layer is used in the form of a coating liquid comprising water as a medium in view of safety and hygiene, although the coating liquid may contain an organic solvent to improve the dispersibility of the resin in water or improve the film-forming property of the resin.

Preferred examples of the organic solvent are alcohols (e.g., isopropanol, ethanol, etc.), diols (e.g., ethylene glycol, diethylene glycol, etc.), glycol derivatives (e.g., ethylcellosolve, n-butylcellosolve, etc.), ethers (e.g., dioxane, tetrahydrofuran, etc.), acetates (e.g. ethyl acetate, etc.), ketones (e.g., methyl ethyl ketone, etc.), amides (e.g., N-methylpyrrolidone, etc.), and the like.

When water is used as the medium of the coating liquid, the resin may be forcedly dispersed by the use of a surfactant. Preferably, the coating liquid is a self-dispersing liquid comprising the resin having a hydrophilic nonionic component such as a polyether or a cationic group such as a quaternary ammonium salt, more preferably a water-soluble or water-dispersible resin having the anionic group. The water-soluble or water-dispersible resin having the anionic group is intended to mean a resin to which a compound having an anionic group (e.g., a sulfonic acid, a carboxylic acid, phosphoric acid, or their salts) by copolymerization or graft copolymerization.

To impart water solubility to the resin, a counter ion to the anionic group can be an alkali metal ion. In view of the moist-heat resistance of the capacitor, the counter ion is preferably selected from amine onium ions including ammonium ion. An amount of the anionic group in the water-soluble or water-dispersible coating resin is preferably from 0.05 to 15% by weight, more preferably from 0.1 to 10% by weight, most preferably from 0.5 to 8% by weight (based on the solid weight). When the amount of the anionic group is less than 0.05% by weight, water solubility or dispersibility of the resin may be insufficient. When this amount exceeds 15% by weight, water resistance of the coating layer may be deteriorated, or the coating layer absorbs moisture so that the films may block each other, or the moist-heat resistant adhesion may be deteriorated.

To improve the anti-blocking property, water resistance, solvent resistance and/or mechanical properties of the coating layer, the coating liquid may contain, as a cross linking agent, an isocyanate compound, an epoxy compound, an amine compound, an aziridine compound, a silane coupling agent, a titanium coupling agent, a zircoaluminate coupling agent, a peroxide, a heat or light-reactive vinyl compound or a photosensitive resin.

To improve the anti-blocking property or a lubricating property, the coating liquid may contain inorganic fine particles such as silica, silica sol, alumina, alumina sol, zirconium sol, kaolin, talc, calcium carbonate, calcium phosphate, titanium oxide, barium sulfate, carbon black, molybdenum sulfide, antimony oxide sol, etc., and organic fine particles such as polystyrene, polyethylene, polyamide, polyester, polyacrylate, epoxy resin, silicone resin, fluororesin, etc. in an amount that surface roughness of the coating layer is in the range described below.

If necessary, the coating liquid may contain an anti-foaming agent, a coating-property improver, a tackifier, an antistatic agent, an organic lubricant, an antioxidant, a UV-light absorber, a foaming agent, a dye or a pigment.

An amount of the alkali metal in the coating liquid is preferably 1000 ppm or less, more preferably 500 ppm or less, in particular 200 ppm or less of the solids in the liquid. When the amount of the alkali metal in the coating liquid is too large, the moist-resistance of the capacitor tends to decrease. The contamination of the alkali metal in the coating liquid is unavoidable in the course from the preparation of the raw material to the preparation of the coating liquid in the industrial production of the capacitor. To prepare the coating liquid, tap water or ground water is often used. In addition, to make the resin water-soluble, the alkali metal is generally used as a source of counter ions to the hydrophilic functional groups of the anionic resins which is preferably used in the present invention. If necessary, the coating liquid is deionized to obtain the liquid having the desired alkali metal ion content.

The above prepared coating liquid is applied to the polyethylene 2,6-naphthalate film by any of conventional coating apparatuses such as a reverse roll coater, a gravure coater, a rod coater, an air doctor coater, or other coating apparatus in a separate step from the production step of a biaxially oriented film, or preferably in the production step of the film.

For applying the coating liquid in the production step of the biaxially oriented film, the coating liquid may be applied to an unoriented film and then the film is successively or simultaneously oriented, the coating liquid may be applied to a uniaxially oriented film and then the film is oriented in a direction perpendicular to the previous orientation direction, or the coating liquid is applied to the biaxially oriented film and then the film is further oriented in the machine and/or transverse directions. Preferably, the coating liquid is applied to a film which has been uniaxially oriented in the machine direction and then the film is further oriented in the transverse direction before or after drying the applied coating liquid, followed by heat treatment, since this method can carry out the film production and the formation of coating layer in a single process.

The orientation of the polyethylene 2,6-naphthalate film is carried out preferably at a temperature of 120° to 180° C., and a draw ratio is at least 4 times, preferably from 6 to 20 times in terms of an area ratio. The oriented film is heat treated at a temperature of 150° to 250° C. Further, the film is preferably shrunk by 0.1 to 20% in the machine and transverse directions in a maximum temperature zone in the heat treatment and/or a cooling zone at an exit from the heat treatment. In particular, the coating liquid is applied to the uniaxially oriented polyethylene 2,6-naphthalate film which has been prepared by roll stretching at a temperature of 120° to 180° C. at a draw ratio of 2 to 6 times and optionally dried and then, the uniaxially oriented film carrying the coating liquid or the coating layer is oriented in a direction perpendicular to the previous orientation direction at a temperature of 120° to 180° C. at a draw ratio of 2 to 6 times and heat treated at a temperature of 150° to 250° C. for 1 to 600 seconds.

According to the above methods, it is possible to dry the coating liquid at the same time as the orientation and reduce the thickness of the coating layer depending on the draw ratio of the film.

A thickness of the coating layer is preferably from 0.01 to 3 μm, more preferably from 0.02 to 1 μm. The thinner coating layer is more preferred in view of the demand for miniaturization of the capacitor. If the thickness of the coating layer is less than 0.01 μm, the coating layer tends to have coating unevenness.

The coating liquid may be applied on one surface of the polyethylene 2,6-naphthalate film, while it may be applied on both surfaces of the film. When the coating liquid is applied on one surface, a coating layer other than the coating layer of the present invention may be formed on the other surface of the film to impart other properties to the film.

To improve the coating property and adhesion of the coating liquid to the film surface, the polyester film may be subjected to chemical treatment or discharge treatment before the application of the coating liquid.

To improve the adhesion or coating property on the surface of the coating layer formed by the present invention, the coating layer surface may be subjected to the discharge treatment.

The formed coating layer has a center line average surface roughness (Ra) of 0.005 to 0.5 μm, more preferably from 0.02 to 0.3 μm, in particular from 0.05 to 0.1 μm. When Ra is less than 0.005 μm, the surface may have insufficient slip property, so that the workability of the film is deteriorated. When Ra exceeds 0.5 μm, the surface is too rough, so that the withstand voltage and/or the moist-heat resistance of the capacitor may be deteriorated. The surface soughness may be formed by the coating layer or the base film.

Preferably, the formed coating layer has a water droplet contact angle of at least 60°. When the water droplet contact angle is less than 60°, the metal-deposited film may have insufficient water resistant adhesion between the coating layer and the deposited metal layer. To this end, an amount of hydrophilic groups, an amount of an emulsifier and/or an amount of a hydrophilic compound in the coating liquid are suitable adjusted.

The coated polyethylene 2,6-naphthalate film used in the present invention has the F5 value, namely a strength at 5% elongation of at least $1.5\times10^8$ Pa in the machine direction, the Young's modulus in the machine direction of at least $5.9\times10^9$ Pa, and the Young's modulus in the transverse direction of at least $5.9\times10^9$ Pa.

If one of the above strength values is not met, the film cannot be made thin sufficiently. Herein, the sufficiently thin film has a thickness of 9 μm or less, preferably 5 μm or less, more preferably 2.5 μm or less. There is no limitation on the minimum thickness. Usually, the minimum thickness of the film is 0.2 μm.

A density of the polyethylene 2,6-naphthalate film is preferably at least 1.360 g/cm$^3$ more preferably at least 1.370 g/cm$^3$. When the film density is too small, the dimensional stability of the film may be deteriorated. To maintain sufficient dimensional stability of the film, shrinkage factors both in the machine and transverse directions are 5% or less, preferably 3% or less, more preferably 2% or less, after keeping the film at 150° C. for 30 minutes. The shrinkage factor can be adjusted by, for example, relaxing the film in a heat set step.

In the present invention, metals to be deposited on the coating layer include aluminum, palladium, zinc, nickel, gold, silver, copper, indium, tin, chromium, titanium, and mixtures thereof, though the metals are not limited to the above ones. Among them, aluminum is preferred. The metal may be used in the form of its oxide.

A thickness of the deposited metal layer is preferably from 10 to 5000 Å. The metal may be usually deposited by vacuum metallization, while electroplating or sputtering may be employed The deposited metal layer may be formed on both surfaces of the polyethylene 2,6-naphthalate film. After metal deposition, the surface of deposited metal may be surface treated, or coated with a resin.

Then, at least two of the metal-deposited polyethylene 2,6-naphthalte films of the present invention are laminated and wound, or a double metal-deposited polyester film of the present invention and other film including the polyethylene 2,6-naphthalte film of the present invention are laminated and wound to obtain a capacitor element. Alternatively, two or more metal-deposited polyethylene 2,6-naphthalate films are simply laminated to obtain the capacitor element. Then, the capacitor element is subjected to heat press, taping, metalicon treatment, voltage treatment, edge sealing, lead wire bonding, etc. to assemble the capacitor.

Assembling of capacitor

On the coating layer of the produced film, aluminum was vacuum metallized to a thickness of 450 Å, using a resistance heating type metallizing apparatus under a reduced pressured of $10^{-4}$ Torr. or lower in a vacuum chamber. The aluminum was deposted in a stripe form with leaving a margin area in the longitudinal direction of the polyester film. That is, the deposited areas each of 8 mm in width and the margin areas each of 1 mm in width were alternatively formed.

The metal-deposited polyester film was slit to obtain a tape having a width of 4.5 mm and a margin area of 1 mm in width on the right or left edge of the tape.

The obtained tape had good adhesion in the evaluation of adhesion.

One left-margined tape and one right-margined tape were laminated and wound while shifting their positions so that the metal-deposited part of 0.5 mm extended beyond the edge of the other tape in each side to obtain a wound body.

The wound body was pressed at 150° C. under pressure of 50 kg/cm$^2$ for 5 minutes. After pressing, a metallicon was spray coated on the both edge surfaces of the wound body, and lead wires were bonded. Thereafter, the wound body was dipped in a liquid bisphenol A epoxy resin and coated with a powder epoxy resin by heating and melting it to form a sheath having a minimum thickness of 0.5 mm to obtain a film capacitor having an electrostatic capacity of 0.1 μF.

The assembling of capacitor could be carried out with good workability.

As shown in Table 2, the produced metal-deposited film capacitor was excellent in withstand voltage and moist-heat resistance and had a small change rate of the electrostatic capacity.

Comparative Example 1

In the same manner as in Example 1 except that no coating liquid was applied, a metal-deposited polyester film capacitor was produced.

Comparative Example 2

In the same manner as in Example 1 except that sodium chloride was added to the coating liquid to increase the sodium content to 2000 ppm while the K content was remained unchanged and the contents of other alkali metals were still below the limit of detection, a metal-deposited polyester film capacitor was produced.

EXAMPLE 2

In the same manner as in Example 1 except that there was used a coating liquid containing 2400 parts of water and 100 parts of a water-soluble polyester consisting of 80% by mole of isophthalic acid, 15% by mole of sebacic acid and 5% by mole of sodium sulfoisophthalic acid; and 75% by mole of ethylene glycol and 25% by mole of diethylene glycol, a metal-deposited polyester film capacitor was produced.

EXAMPLE 3

In the same manner as in Example 1 except that there was used a coating liquid containing 2400 parts of water, 80 parts of a water-dispersible polyurethane having a carboxylic acid ammonium salt group as a functional group (Hydran AP 40 manufactured by Dainippon Ink Chemicals Co., Ltd.) and 20 parts of a water-dispersible polyester having a carboxylic acid ammonium salt group as a functional group (Polyester WR-961 manufactured by Nippon Gosei Kagaku Kygyo Kabushiki Kaisha), a metal-deposited polyester film capacitor was produced.

Comparative Example 3

In the same manner as in Example 1 except that a polyethylene 2,6-naphthalte raw material having the intrinsic viscosity of 0.68 and the carboxyl value of 80 equivalent/ton but containing substantially no particle was used, a metal-deposited film was prepared. It had the center line average surface roughness Ra of 0.002 μm, and had poor slipping property. Therefore, the film could not be practically used.

Comparative Example 4

By conventional methods, a mass of polyethylene terephthalate having the intrinsic viscosity of 0.66 and the carboxyl group value of 45 equivalent/ton and containing 0.3% by weight of silica particle of 1.2 μm in an average particle size was dried, extruded at 290° C. in a sheet form and cooled by an electrostatic application cooling method to obtain an amorphous sheet.

The amorphous sheet was stretched at 90° C. in the machine direction at a draw ratio of 4.2 times. On one surface of the uniaxially oriented film, there was coated a coating liquid containing 100 parts (solid component weight) of a water-dispersible polyurethane having a carboxylic acid ammonium salt group as a functional group (Hydran AP 40 manufactured by Dainippon Ink Chemicals Co., Ltd.) in 2400 parts of water. Then, the film was stretched at 110° C. in the transverse direction at a draw ratio of 3.9 times and heat set at 230° C. while tentering. The biaxially oriented film was cooled with shrinking it by 4% in each of the machine and transverse directions and wound to obtain the biaxially oriented polyethylene 2,6-naphthalate film having a film thickness of 1.5 μm and carrying the coating layer of 0.04 μm in thickness.

In the same manner as in Example 1 except that the above prepared metal-deposited film was used, a metal-deposited polyester film capacitor was produced. However, the film was broken many times, and a yield of the capacitor was very low.

TABLE 1

| | Coating liquid Alkali metal content (ppm) | | | Base Film | | | | |
|---|---|---|---|---|---|---|---|---|
| Example No. | Na | K | Others | Ra (μm) | Water droplet contact angle | F5 ($10^6$Pa) | Young's modulus ($10^9$Pa) Machine | Transverse |
| 1 | 44 | 5.8 | ≈0 | 0.020 | 63° | 2.0 | 8.2 | 7.4 |
| 2 | 160 | 9.7 | ↑ | ↑ | ↑ | ↑ | ↑ | ↑ |
| 3 | 50 | 10.2 | ↑ | ↑ | ↑ | ↑ | ↑ | ↑ |
| Com.1 | — | — | — | ↑ | 66° | ↑ | ↑ | ↑ |
| Com.2 | 2000 | 5.8 | ≈0 | ↑ | 62° | ↑ | ↑ | ↑ |
| Com.3 | 44 | ↑ | ↑ | 0.002 | 63° | ↑ | ↑ | ↑ |

TABLE 1-continued

| Example No. | Coating liquid Alkali metal content (ppm) Na | K | Others | Base Film Ra (μm) | Water droplet contact angle | F5 ($10^6$Pa) | Young's modulus ($10^9$Pa) Machine | Transverse |
|---|---|---|---|---|---|---|---|---|
| Com.4 | 44 | ↑ | ↑ | 0.020 | ↑ | 1.3 | 6.3 | 6.3 |

TABLE 2

| Example No. | Deposited film Processability | Adhesion | Capacitor Withstand voltage (kV/μm) | Change of elecrostatic capacity (%) Unloaded | Loaded |
|---|---|---|---|---|---|
| 1 | 0 | 0 | 0.56 | 0.5 | 0.5 |
| 2 | 0 | 0 | 0.56 | 0.5 | −0.5 |
| 3 | 0 | 0 | 0.56 | 0.5 | 0.2 |
| Com.1 | 0 | X | 0.51 | −13.5 | −50.5 |
| Com.2 | 0 | Δ | 0.56 | −5.6 | −21.9 |
| Com.3 | X | — | — | — | — |
| Com.4 | X | — | — | — | — |

What is claimed is:

1. A capacitor comprising a polyethylene 2,6-naphthalate film as a base film, a coating layer, formed on at least one surface of said base film, which coating layer comprises a water-soluble or water-dispersible resin and has a center line average surface roughness (Ra) of 0.005 to 0.5 μm, and a metal layer deposited on said coated polyethylene 2,6-naphthalate film, wherein said coated polyethylene 2,6-naphthalate film has an F5 value in a machine direction of at least $1.5\times10^8$ Pa, a Young's modulus in a machine direction of at least $5.9\times10^9$ Pa, and a Young's modulus in a transverse direction of at least $5.9\times10^9$ Pa.

2. The capacitor according to claim 1, wherein said polyethylene 2,6-naphthalate has an intrinsic viscosity of at least 0.40 cps.

3. The capacitor according to claim 1, wherein said polyethylene 2,6-naphthalate has a carboxyl value of from 15 to 100 equivalent/ton.

4. The capacitor according to claim 1, wherein said water-soluble or water-dispersible resin is a polyurethane resin or a polyester resin.

5. The capacitor according to claim 1, said water-soluble or water-dispersible resin has an anionic group in an amount of from 0.05 to 15% by weight.

6. The capacitor according to claim 1, wherein said coating layer has a thickness of from 0.01 to 3 μm.

7. The capacitor according to claim 1, wherein said coating layer has a water droplet contact angle of at least 60°.

8. The capacitor according to claim 1, wherein said polyethylene 2,6-naphthalate film has a thickness of 9 μm or less.

* * * * *